United States Patent
Miyakawa et al.

(10) Patent No.: US 10,670,618 B2
(45) Date of Patent: Jun. 2, 2020

(54) AUTOMATED ANALYSIS DEVICE, AND LID OPENING/CLOSING MECHANISM

(71) Applicant: HITACHI HIGH-TECHNOLOGIES CORPORATION, Tokyo (JP)

(72) Inventors: Takushi Miyakawa, Tokyo (JP); Kazuhiro Noda, Tokyo (JP); Yukinori Sakashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 374 days.

(21) Appl. No.: 15/547,533

(22) PCT Filed: Jan. 7, 2016

(86) PCT No.: PCT/JP2016/050402
§ 371 (c)(1),
(2) Date: Jul. 31, 2017

(87) PCT Pub. No.: WO2016/136289
PCT Pub. Date: Sep. 1, 2016

(65) Prior Publication Data
US 2018/0024154 A1  Jan. 25, 2018

(30) Foreign Application Priority Data
Feb. 26, 2015 (JP) .................... 2015-037357

(51) Int. Cl.
*G01N 35/00* (2006.01)
*G01N 35/02* (2006.01)
(Continued)

(52) U.S. Cl.
CPC ....... *G01N 35/025* (2013.01); *G01N 35/1002* (2013.01); *B01L 3/50825* (2013.01);
(Continued)

(58) Field of Classification Search
CPC ... G01N 35/025; G01N 35/00; G01N 35/1002
(Continued)

(56) References Cited

U.S. PATENT DOCUMENTS 5,628,962 A * 5/1997 Kanbara ................. B01L 99/00
215/235
2001/0028863 A1 10/2001 Kitagawa
(Continued)

FOREIGN PATENT DOCUMENTS

JP 64-061667 A 3/1989
JP 401061667 * 3/1989
(Continued)

OTHER PUBLICATIONS

International Search Report PCT/JP2016/050402 dated Mar. 29, 2016.
(Continued)

*Primary Examiner* — Robert R Raevis
(74) *Attorney, Agent, or Firm* — Mattingly & Malur, PC

(57) ABSTRACT

Provided is an automated analysis device equipped with a lid opening/closing mechanism with which it is possible to selectively open or close lids of a plurality of reagent containers, as well as to close all of the lids of the plurality of reagent containers, regardless of their current open/closed state. Each of a plurality of hooks 102 rotatably linked to a hook base part 104 has: a claw portion 203 which, when oriented to engage with a lid 101, causes force to act on the lid 101 in the opening direction; a basal part 202 which, when oriented to engage with the lid 101, causes force to act on the lid in the closing direction; and a closing protrusion 201 which, when oriented not to engage with the lid 101, causes force to act on the lid in the closing direction.

5 Claims, 19 Drawing Sheets

(51) Int. Cl.
  *G01N 35/10* (2006.01)
  *G01N 35/04* (2006.01)
  *B01L 3/00* (2006.01)

(52) U.S. Cl.
  CPC .............. *G01N 2035/00287* (2013.01); *G01N 2035/0405* (2013.01)

(58) Field of Classification Search
  USPC ..... 73/863.01, 61.56, 64.56, 864.21–864.25; 422/63, 64, 67–82.13
  See application file for complete search history.

(56) References Cited

U.S. PATENT DOCUMENTS

2007/0110624 A1    5/2007   Lare et al.
2012/0186200 A1    7/2012   Jones et al.
2012/0328475 A1   12/2012   Sakairi et al.

FOREIGN PATENT DOCUMENTS

| | | |
|---|---|---|
| JP | 08-094624 A | 4/1996 |
| JP | 2001-343392 A | 12/2001 |
| JP | 2007-511420 A | 5/2007 |
| JP | 2009-109403 A | 5/2009 |
| WO | 96/09554 A1 | 3/1996 |
| WO | 11/074472 A1 | 6/2011 |

OTHER PUBLICATIONS

International Preliminary Report on Patentability received in corresponding International Application No. PCT/JP2016/050402 dated Sep. 8, 2017.

* cited by examiner

[Fig. 1]
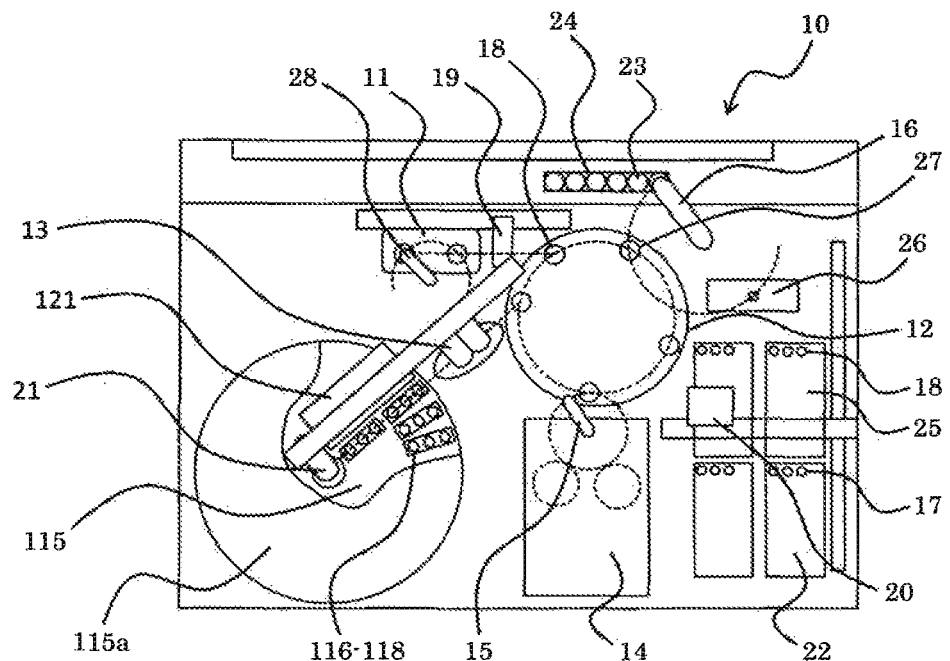
[Fig. 2]
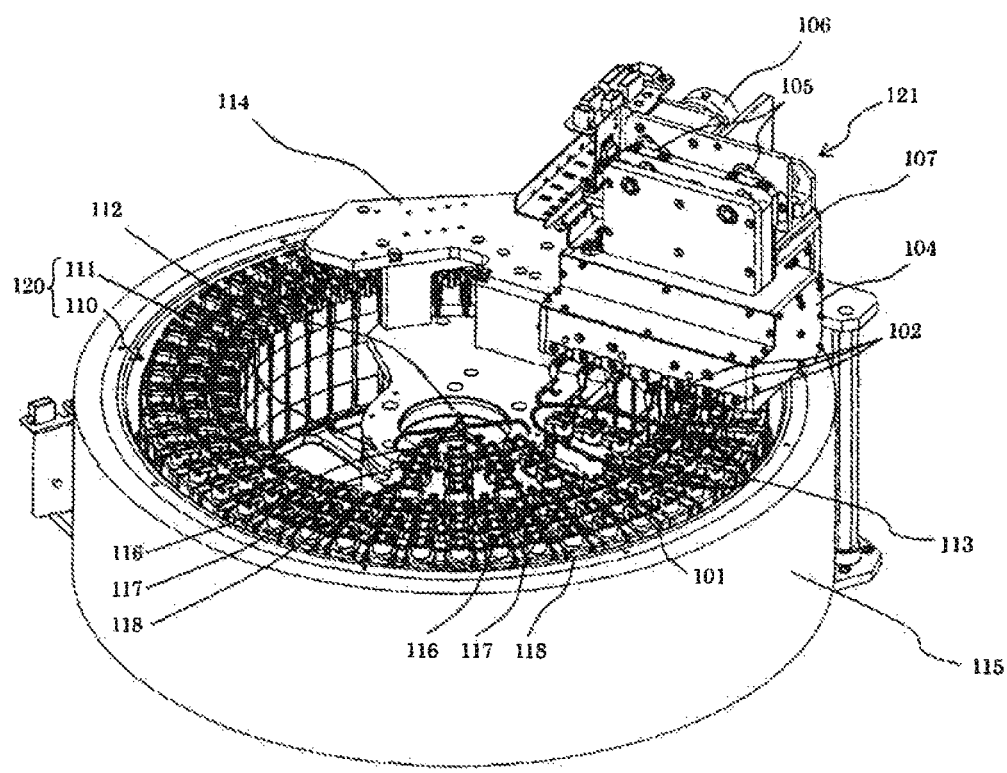

[Fig. 3]
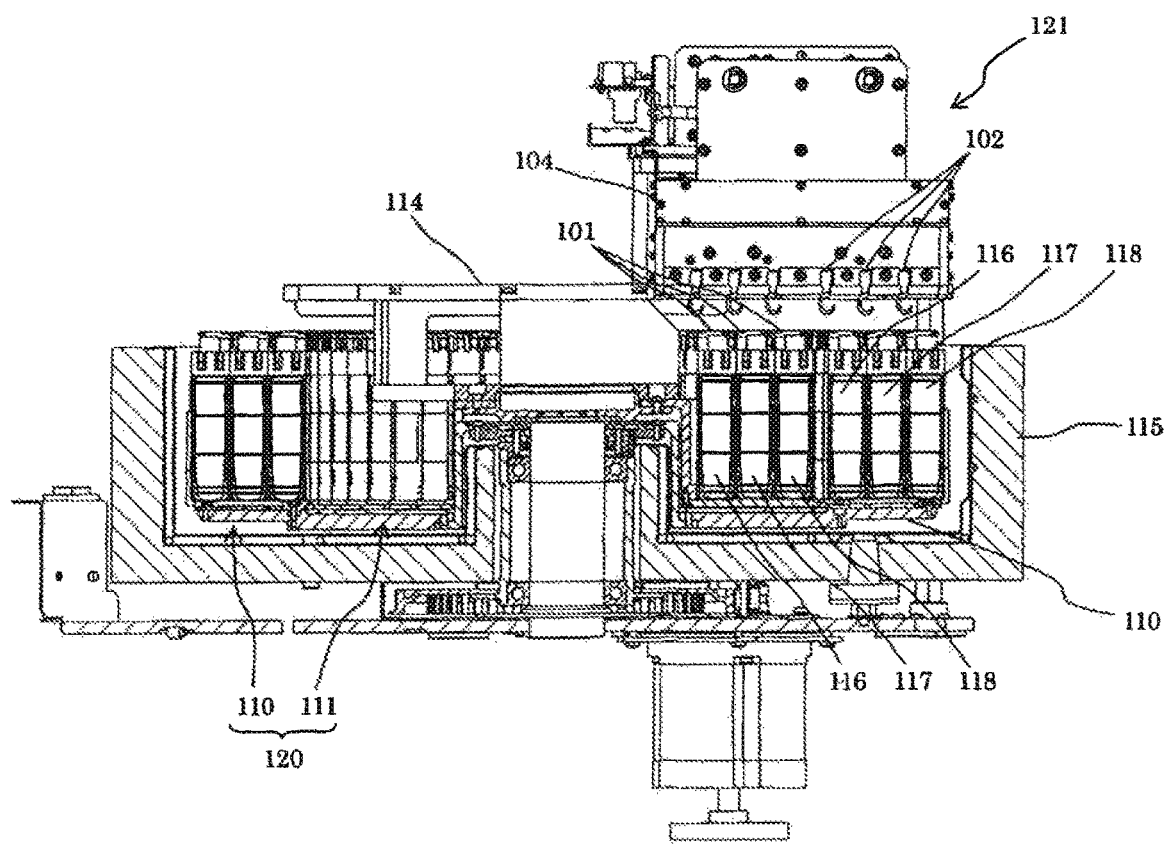

[Fig. 4]
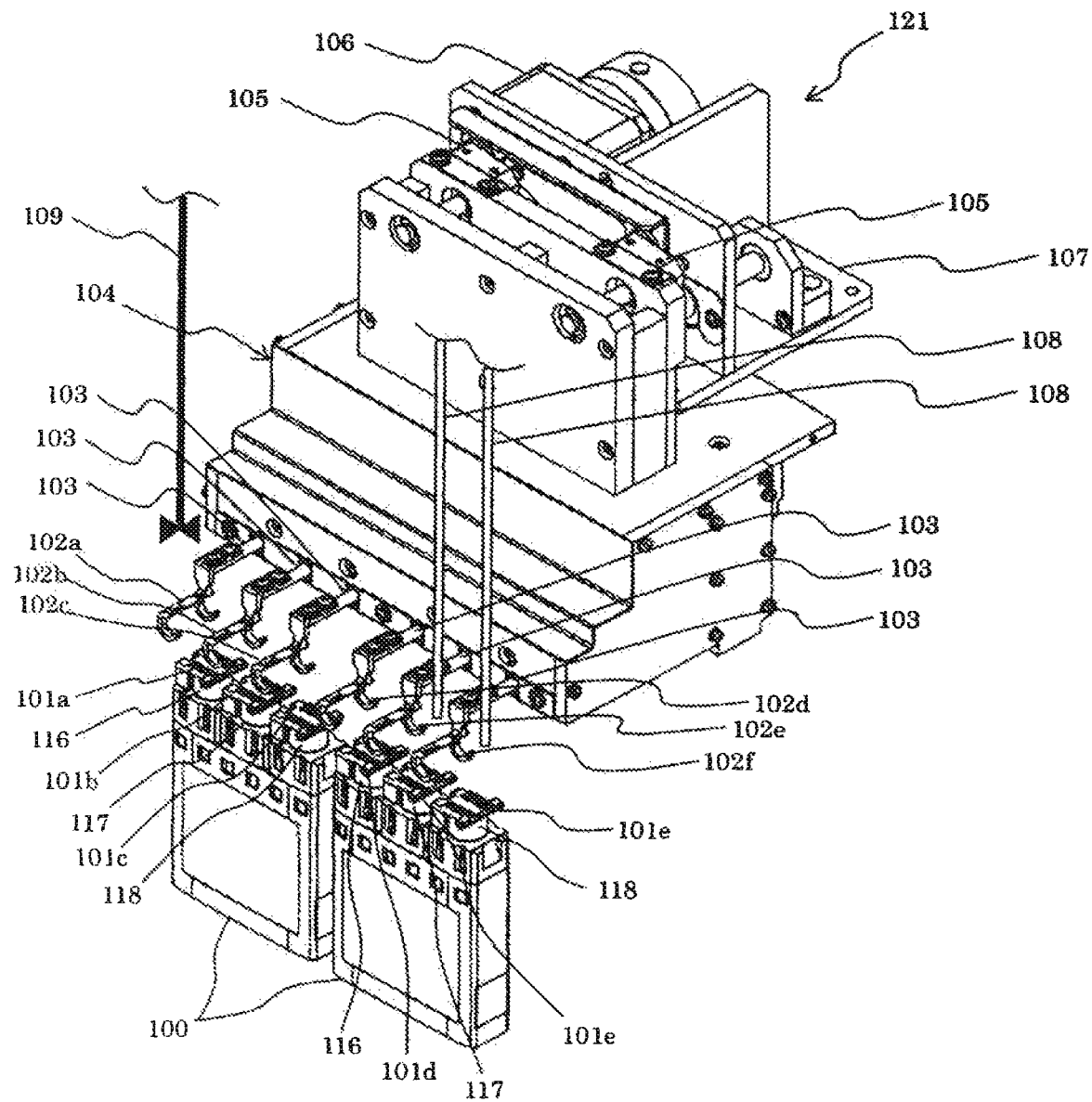

[Fig. 5]
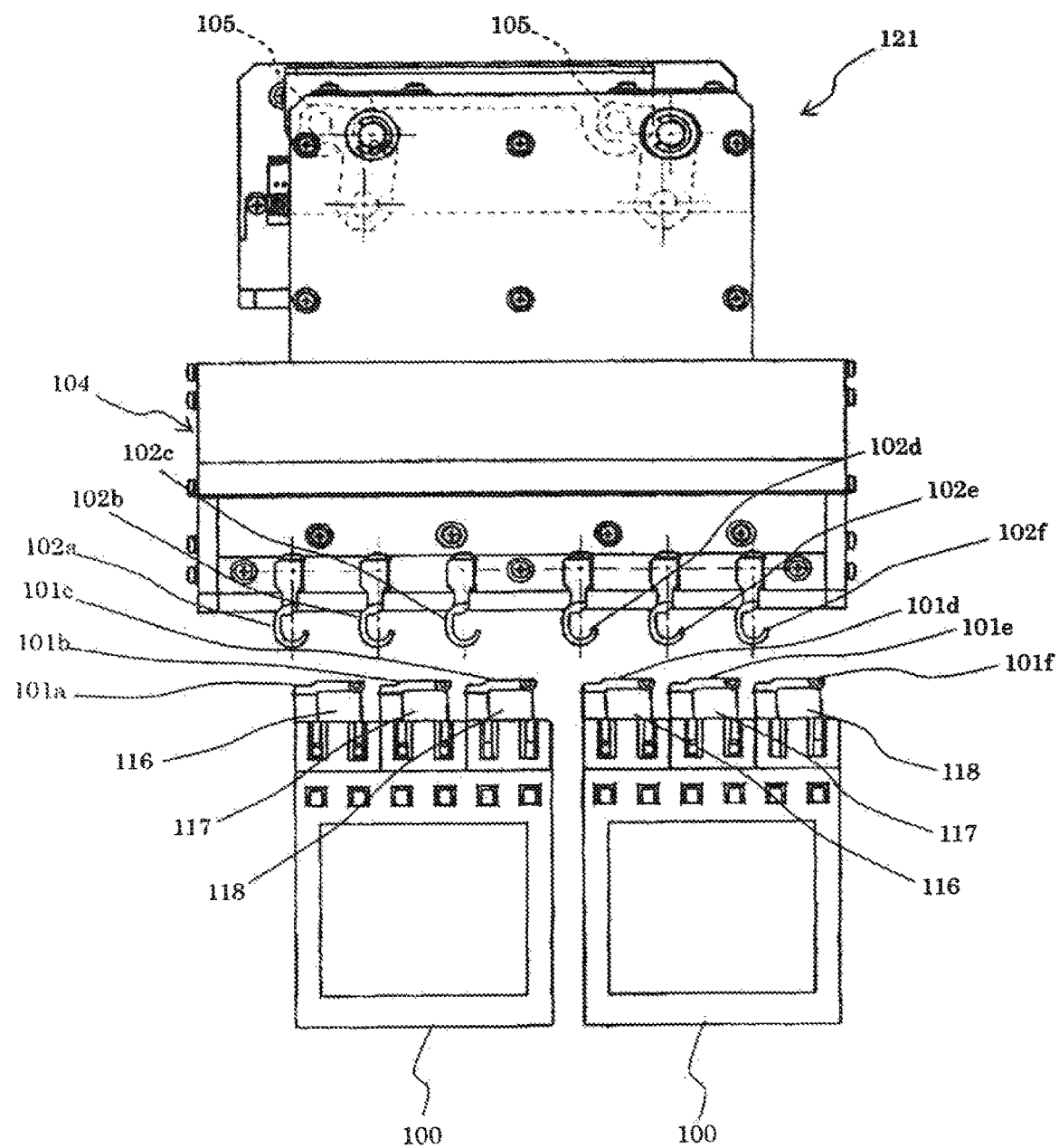

[Fig. 6]
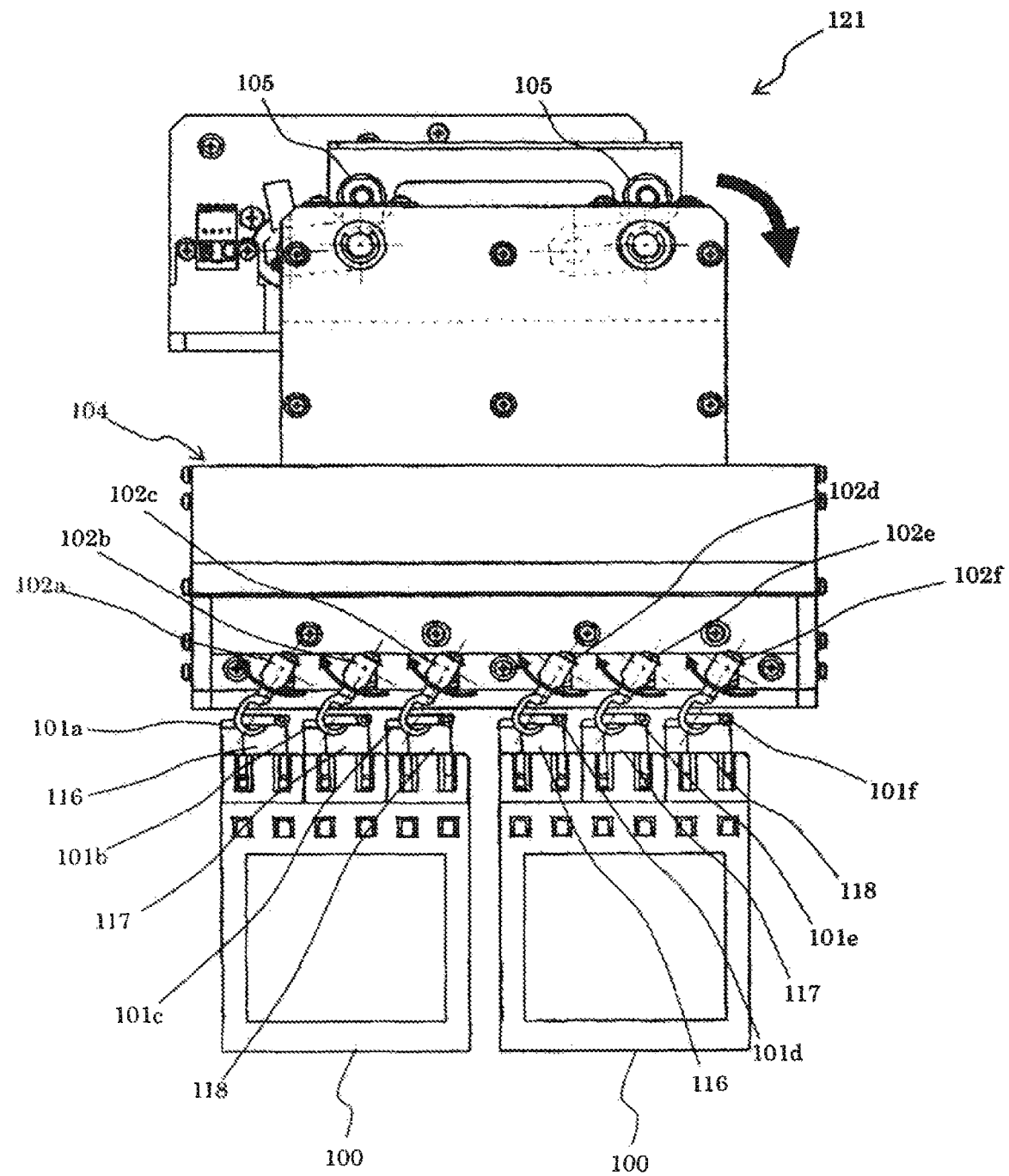

[Fig. 7]
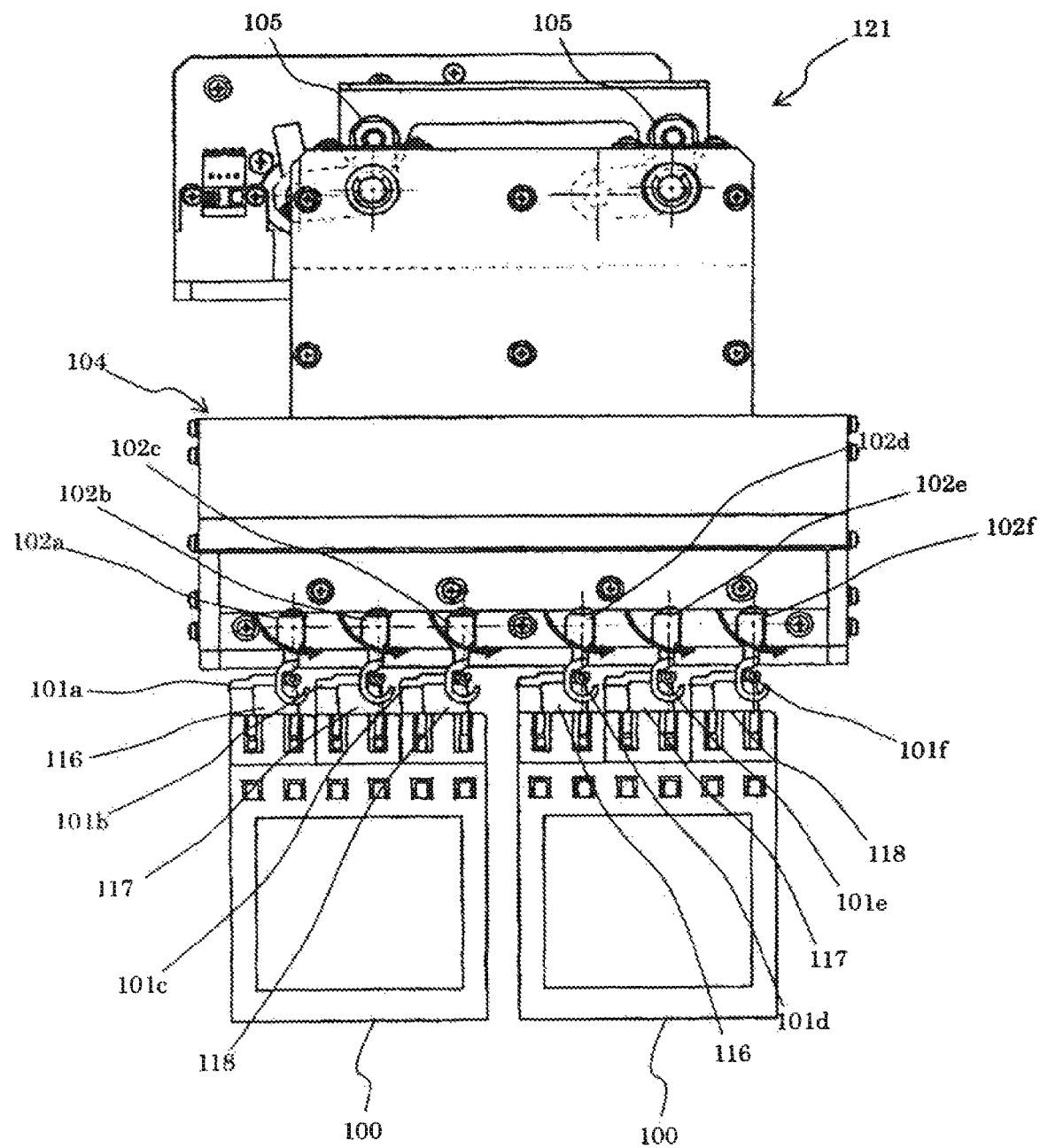

[Fig. 8]
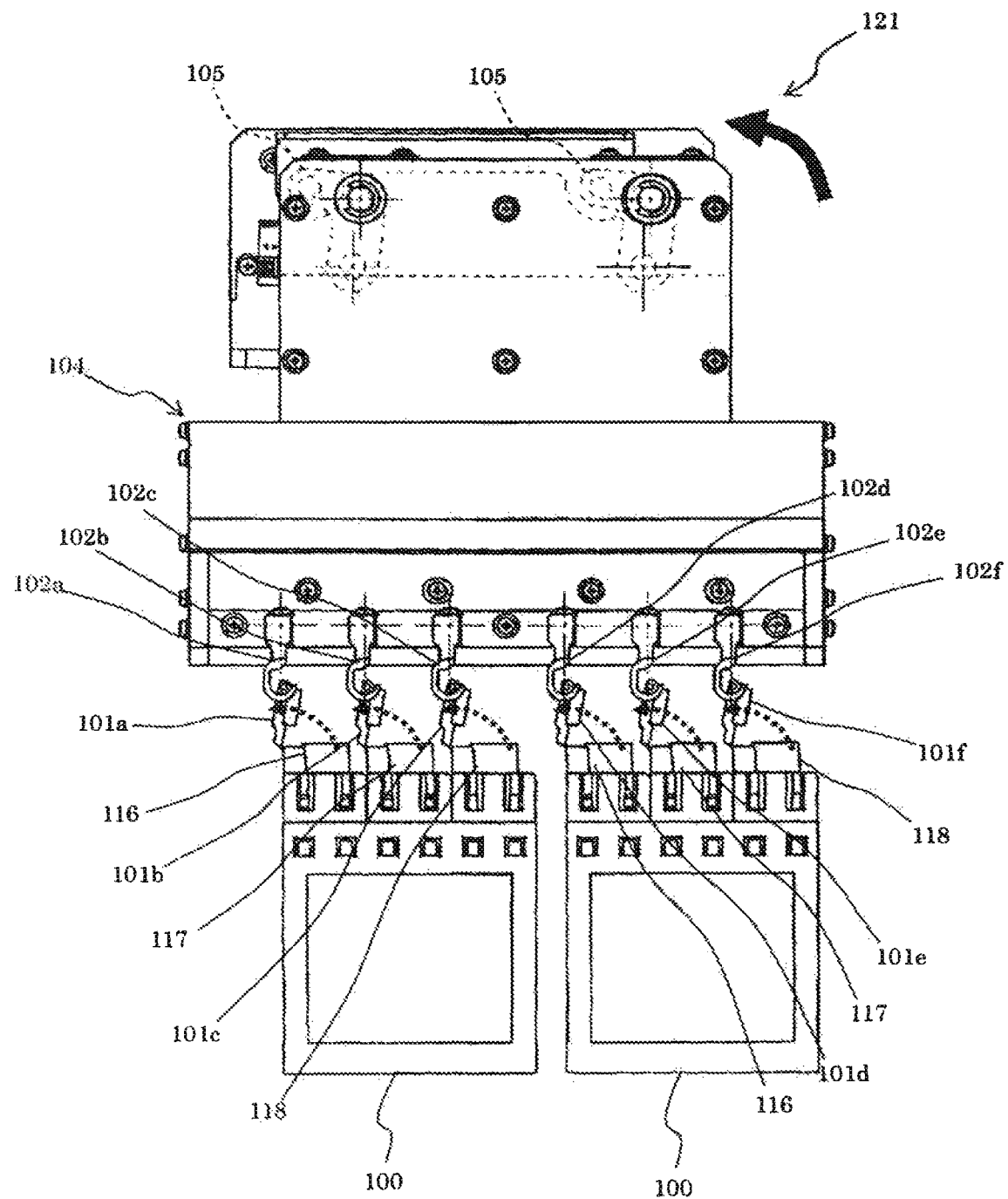

[Fig. 9]
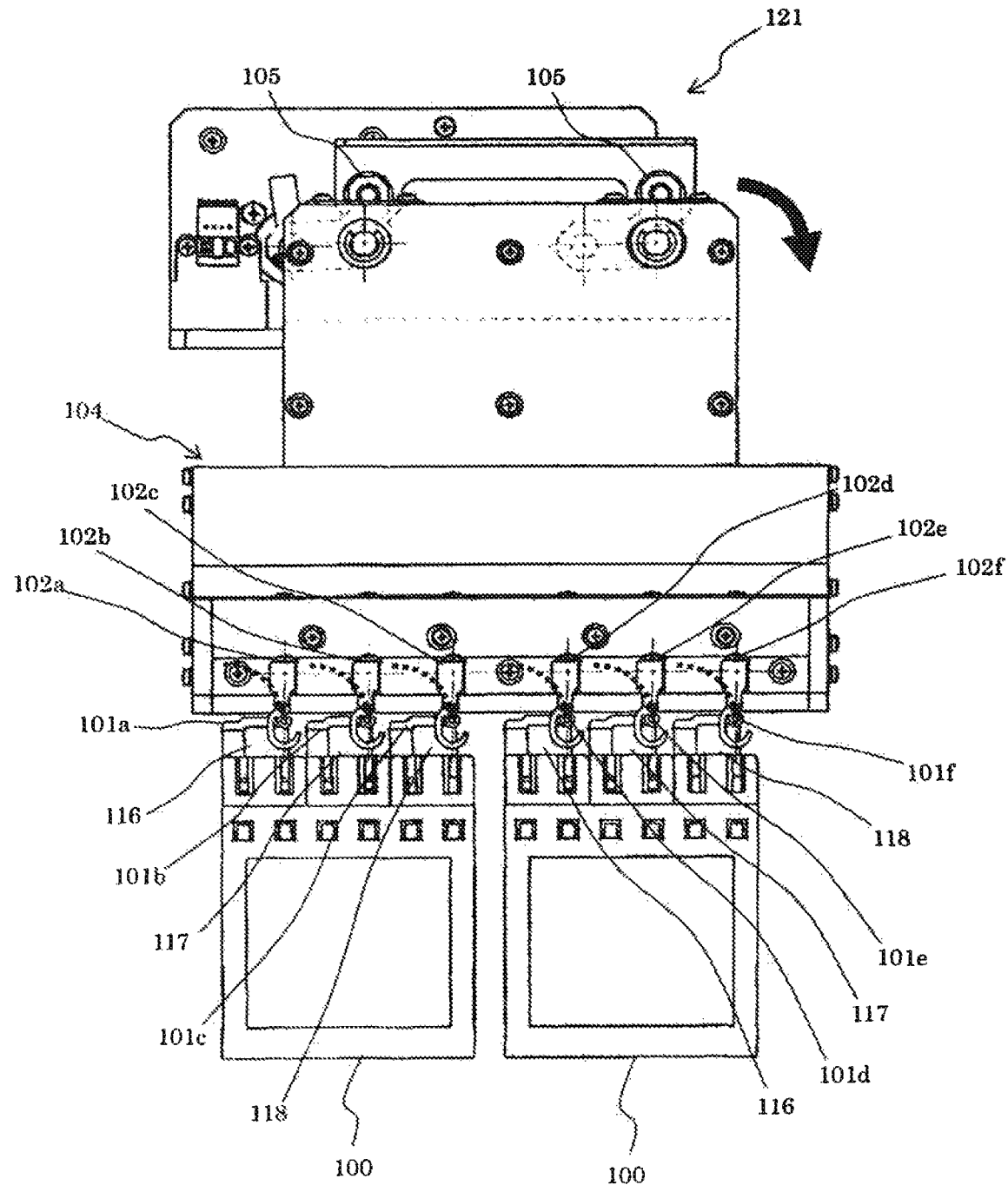

[Fig. 10]
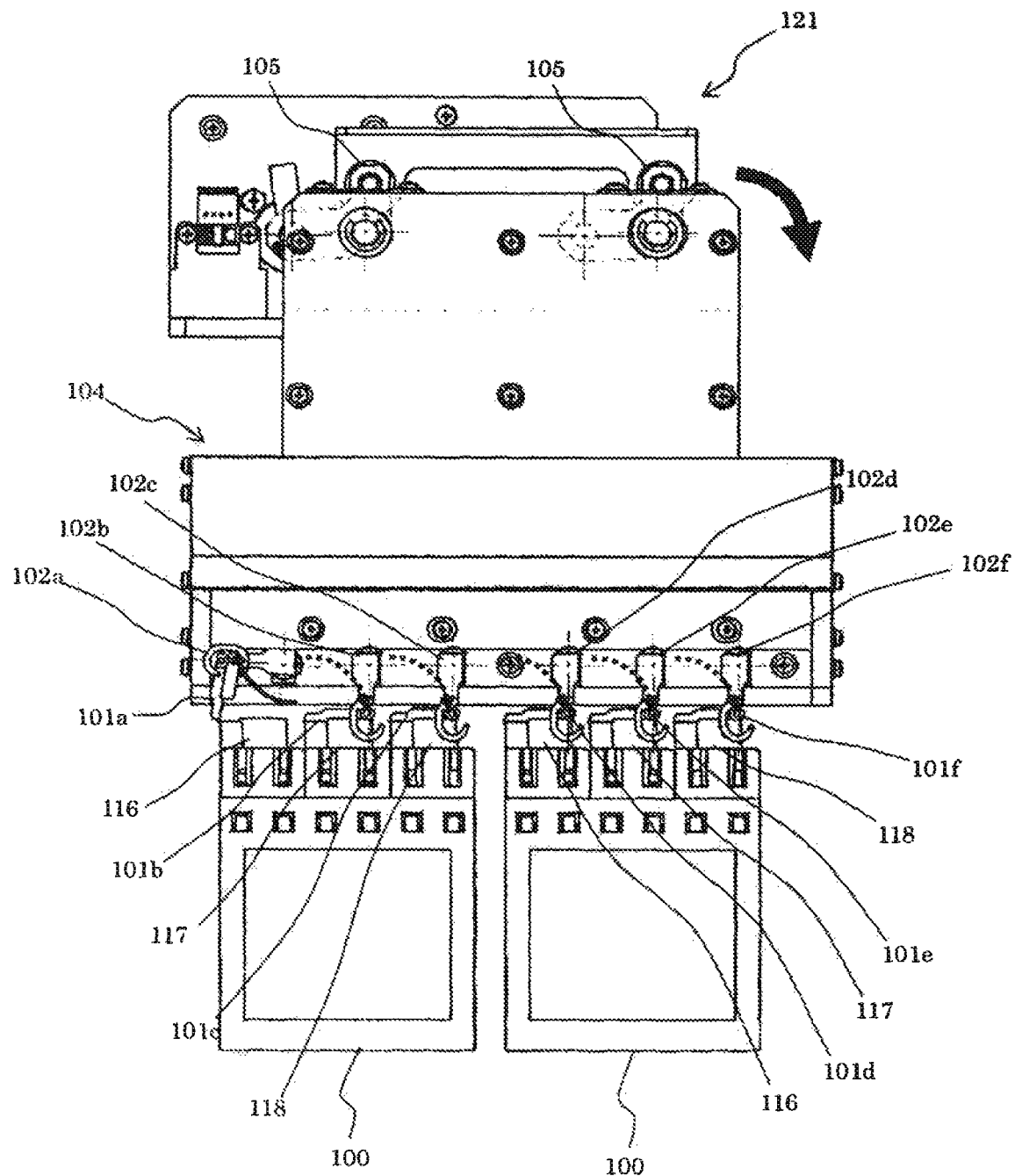

[Fig. 11]
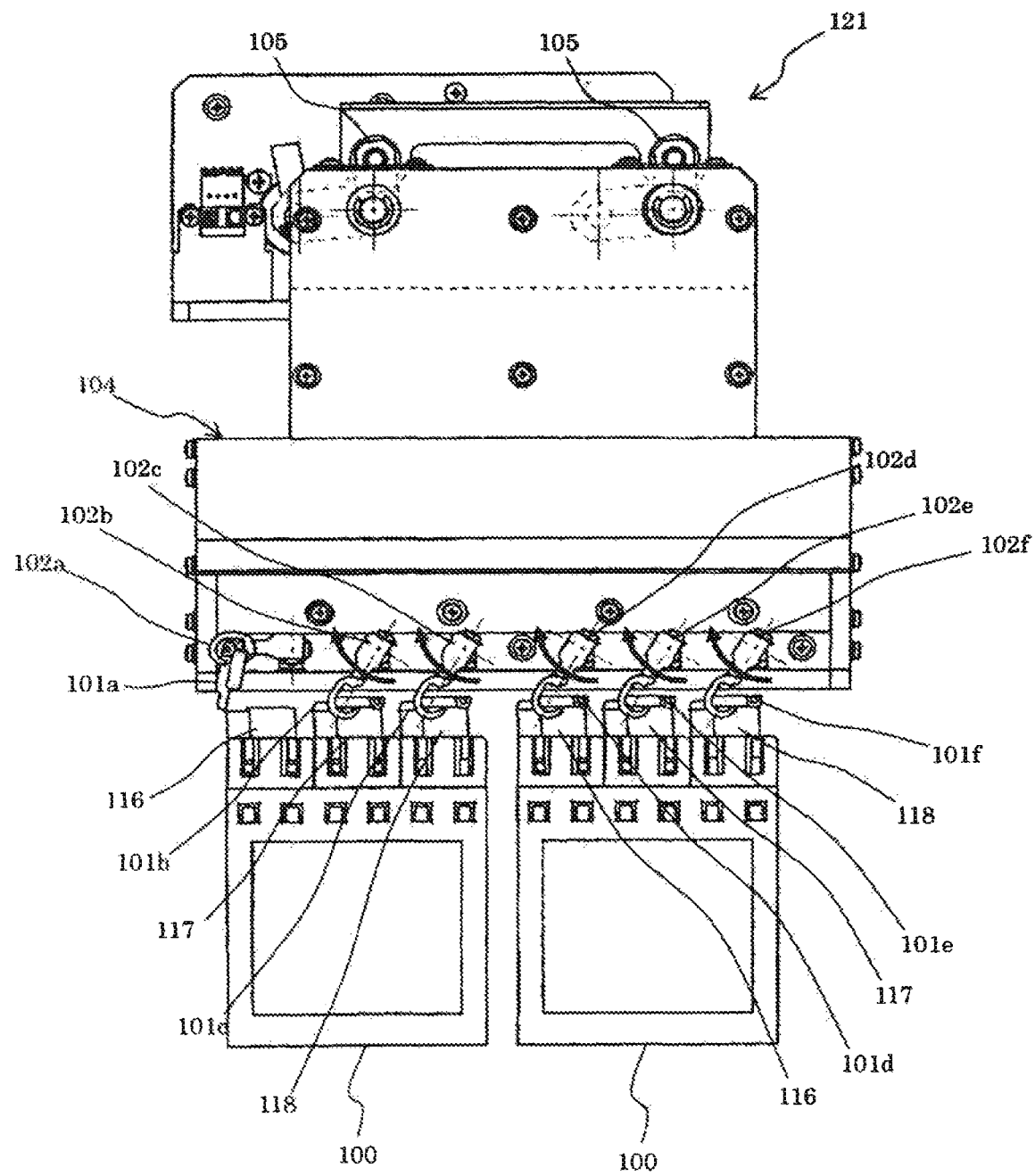

[Fig. 12]
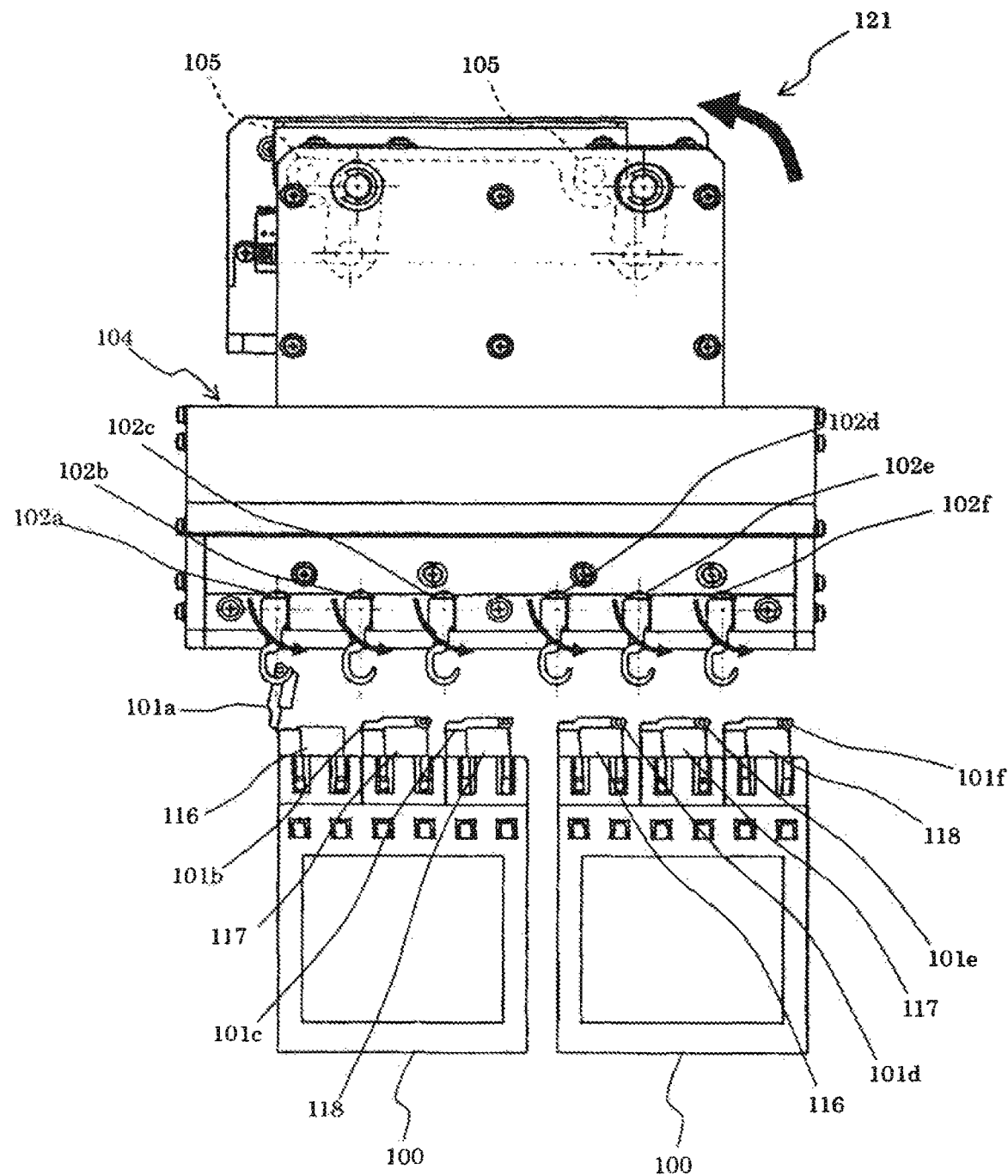

[Fig. 13]
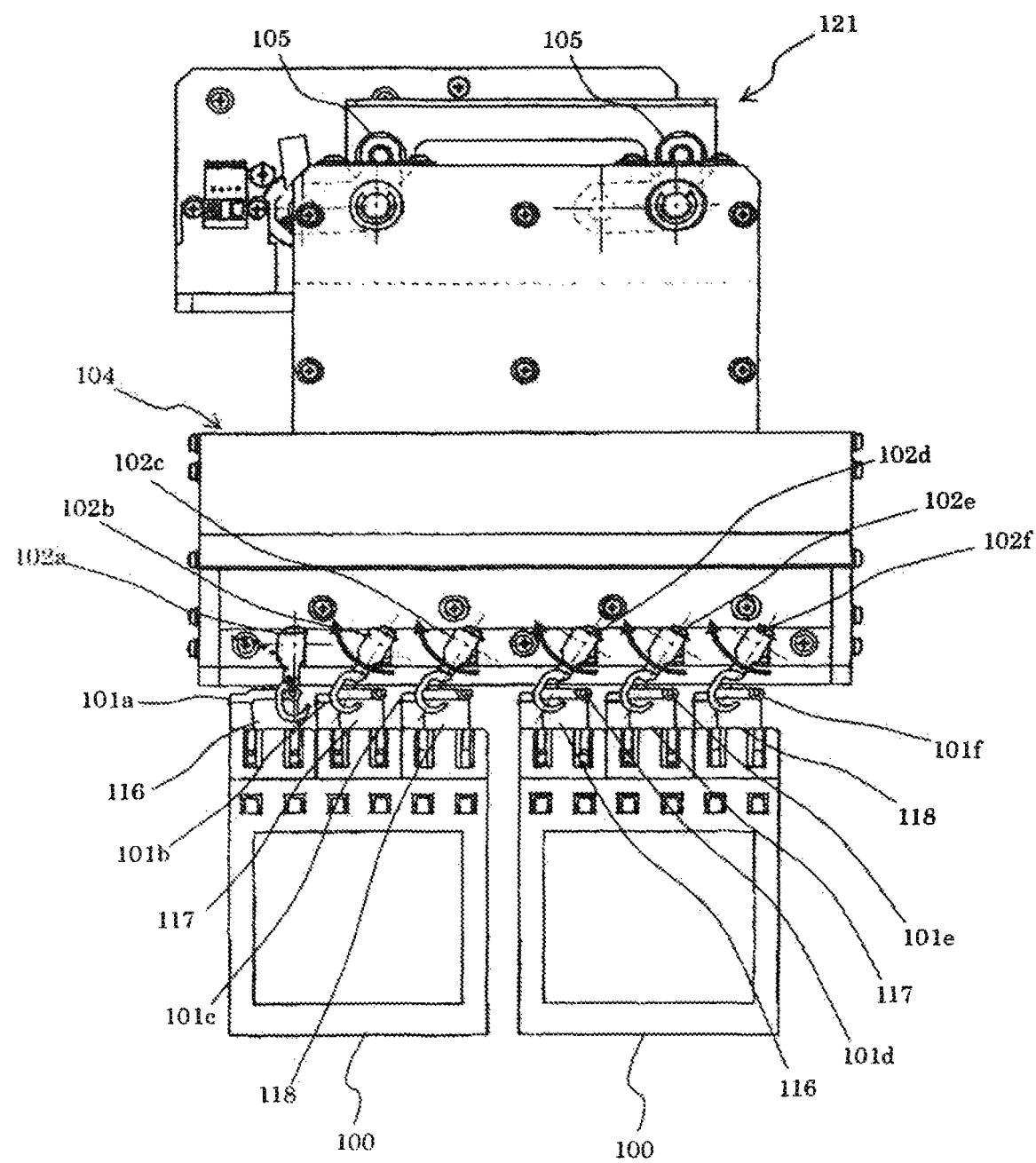

[Fig. 14]
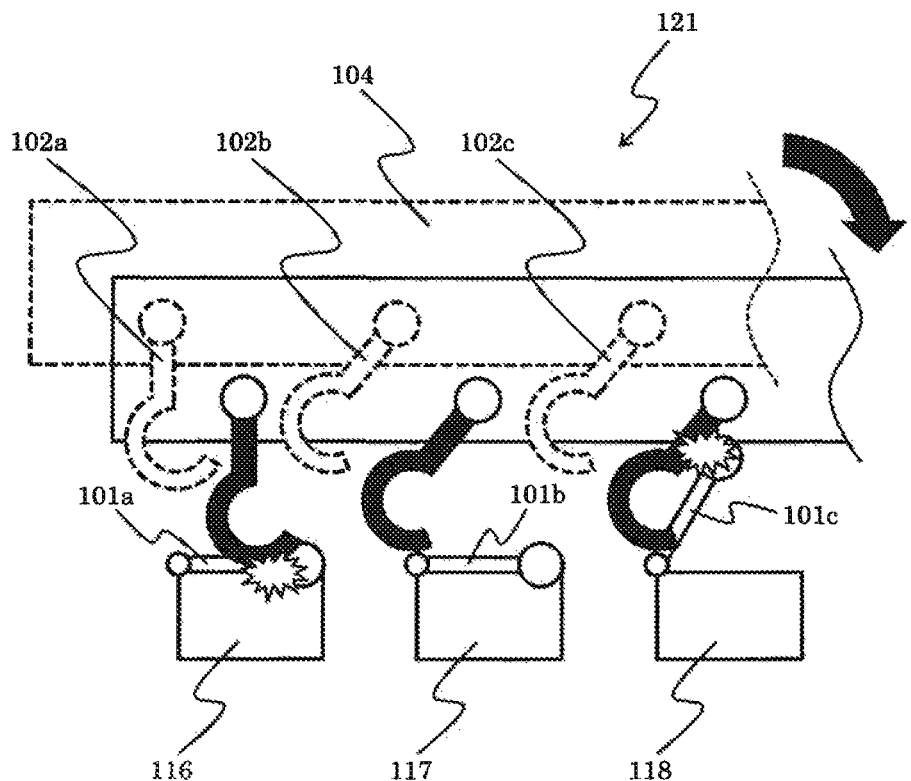
[Fig. 15A]
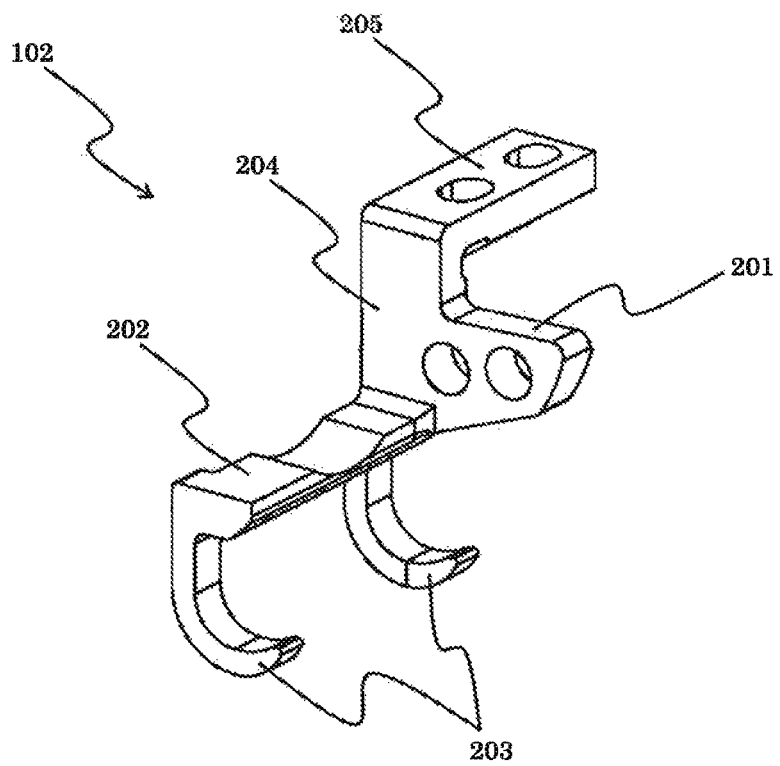

[Fig. 15B]
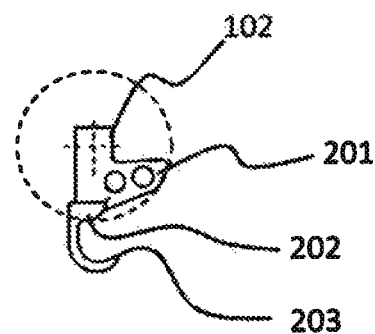
[Fig. 15C]
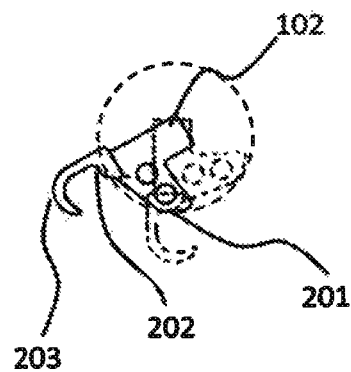

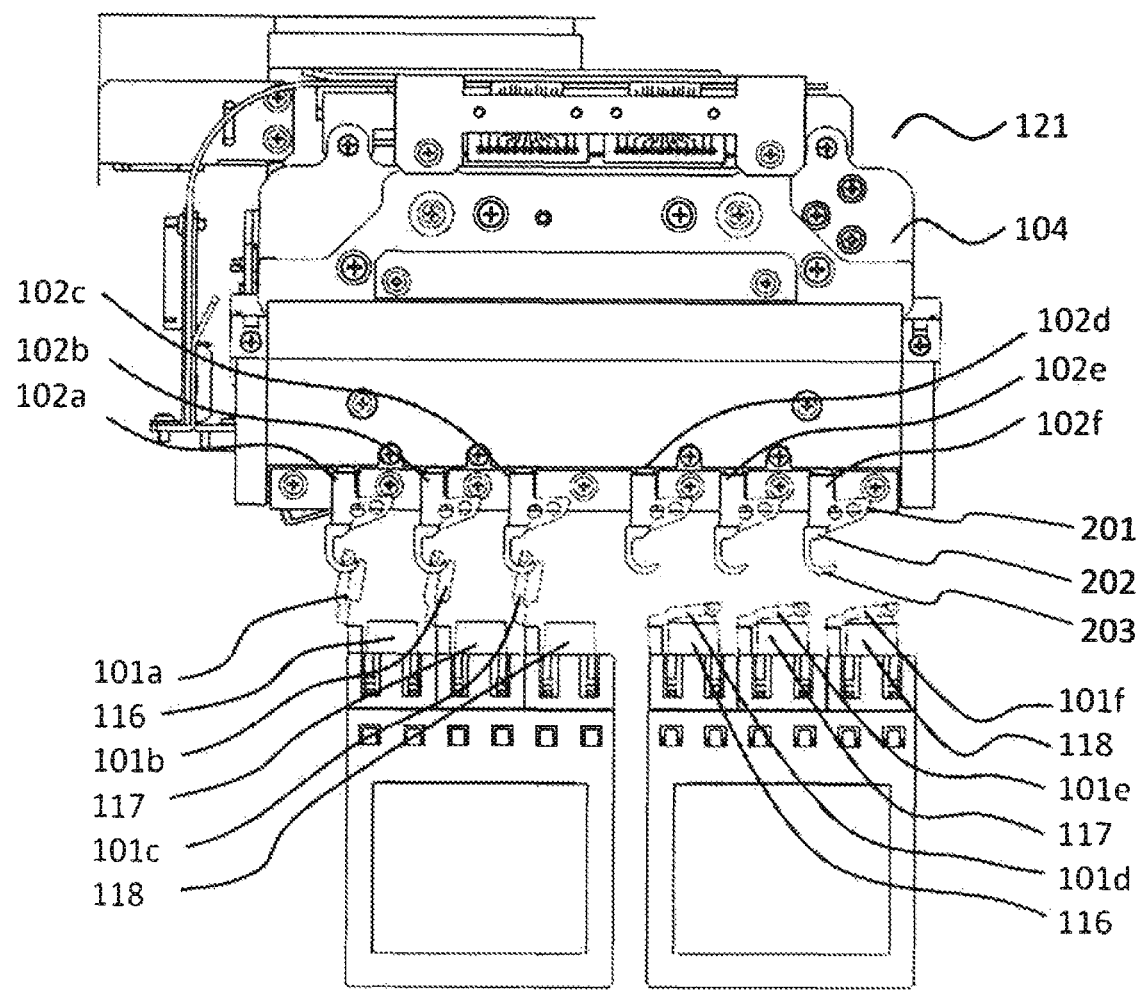
[Fig. 16]

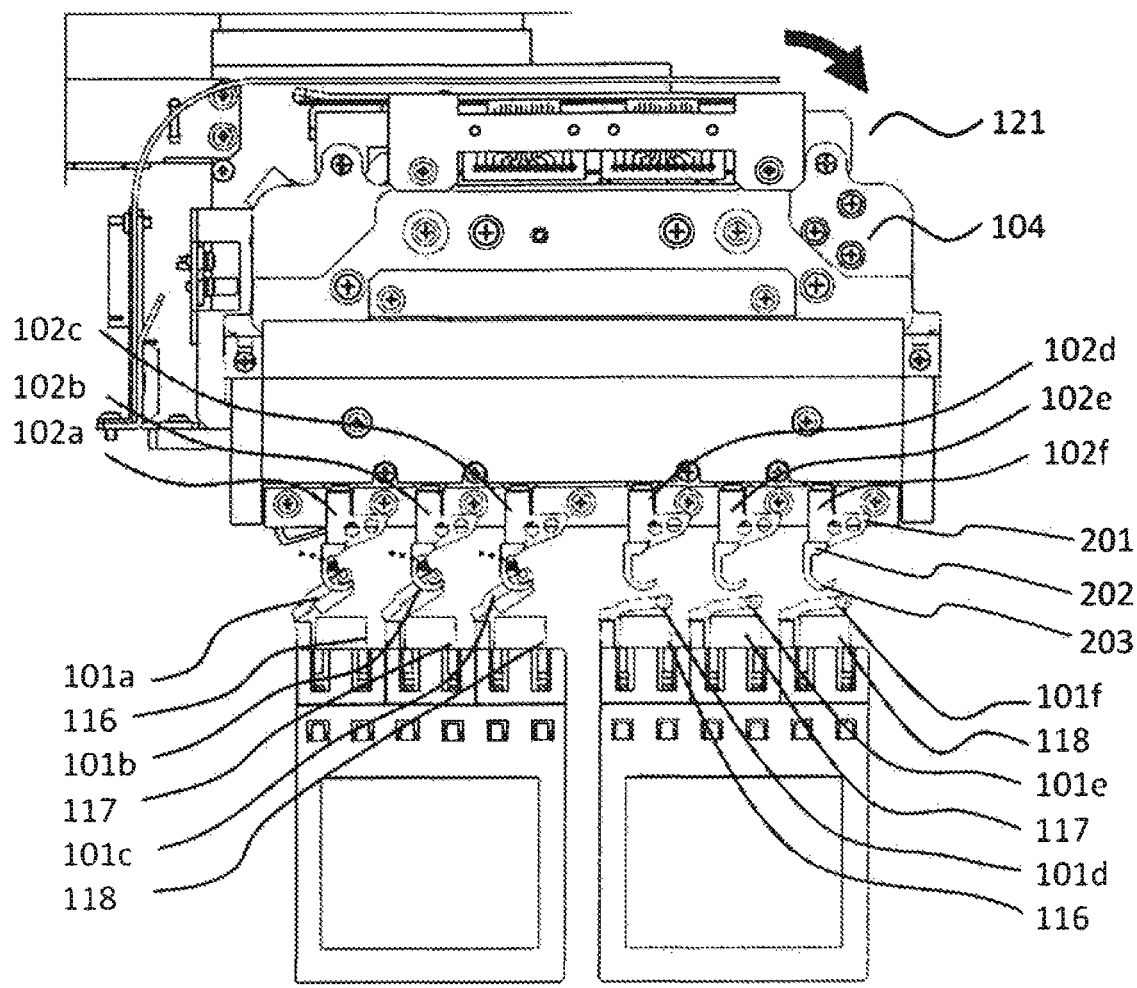
[Fig. 17]

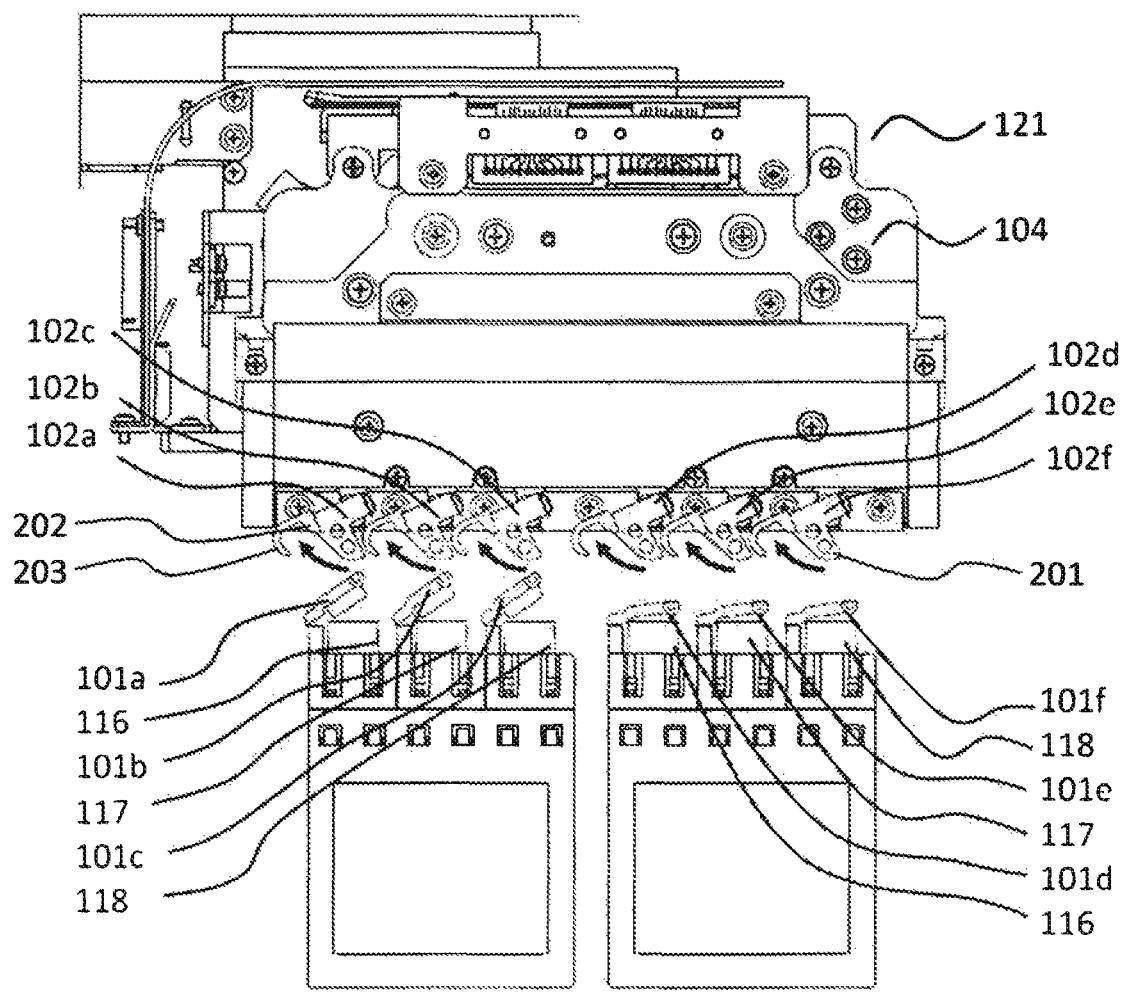
[Fig. 18]

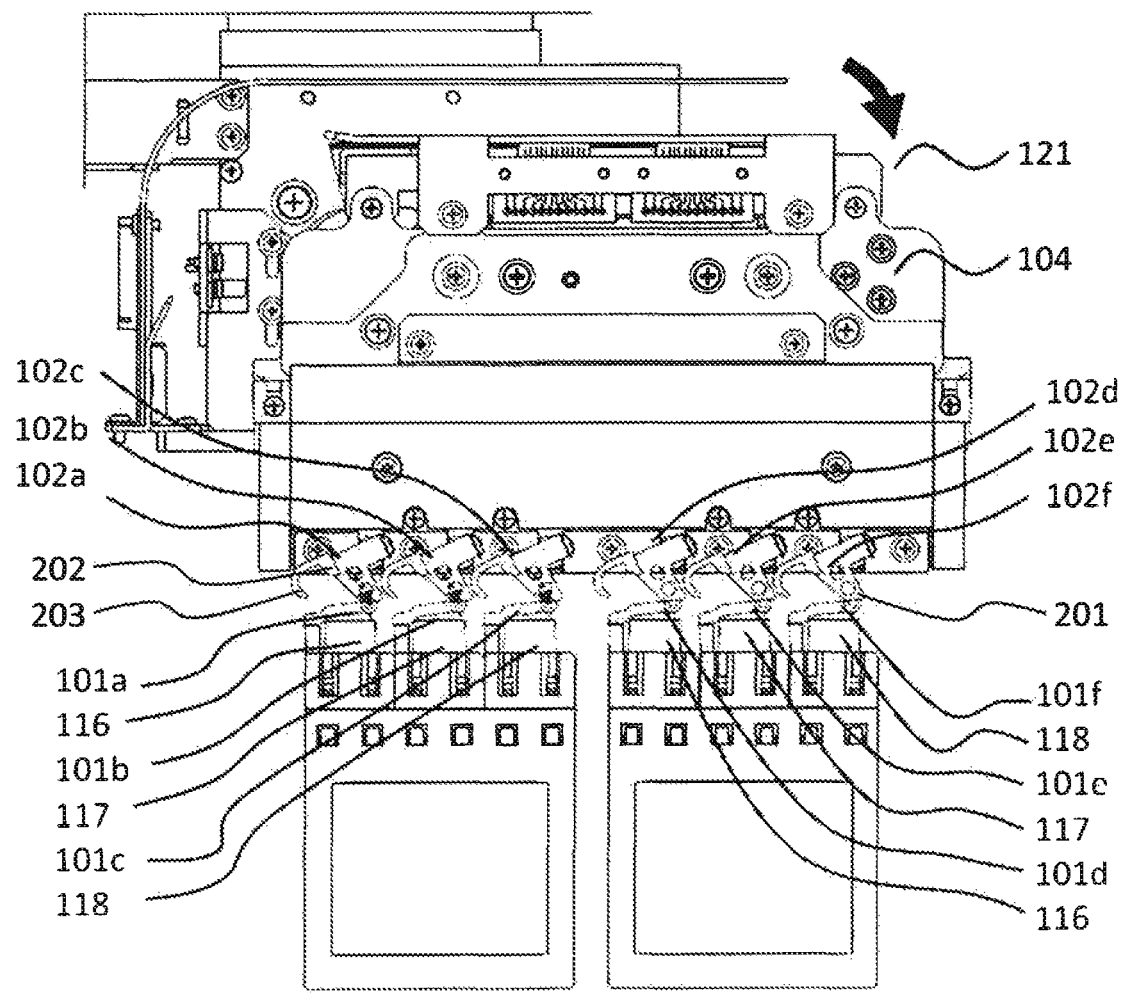
[Fig. 19]

[Fig. 20]
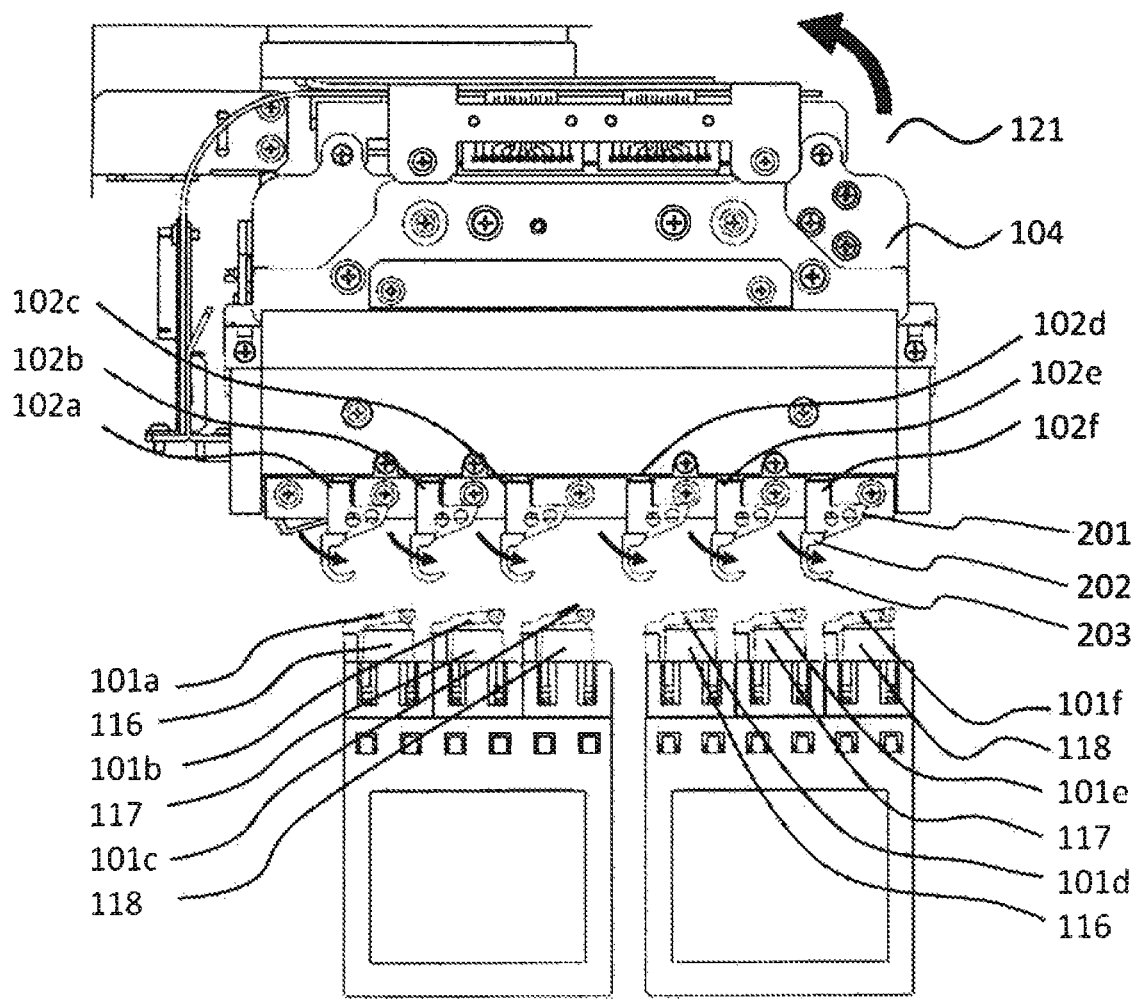

AUTOMATED ANALYSIS DEVICE, AND LID OPENING/CLOSING MECHANISM

TECHNICAL FIELD

The present invention relates to an automated analysis device used for chemical analysis such as biochemical analysis or immunological analysis in clinical examination, and a lid opening/closing mechanism with a lid mounted on the device.

BACKGROUND ART

In immunological analysis or the like, for example, magnetic particles, a labeled antibody containing a labeled substance, and an antibody binding the magnetic particles to a measurement target object are mixed with a sample containing the measurement target object so as to cause an antigen-antibody reaction, a reaction product in which the measurement target object, the magnetic particles, and the labeled substance are bonded together is captured with magnetic separation means, a voltage is applied to the captured reaction product so that a light emission amount thereof is measured, and thus the measurement target object is quantified. In a case where such chemical analysis is mechanically performed, an automated analysis device may be used.

In the automated analysis device, a reagent container in which a solution containing magnetic particles is accommodated, a reagent container in which a solution containing a labeled substance is accommodated, and a reagent container in which a solution containing an antibody is accommodated are prepared as a set for each measurement item. The reagent containers are respectively attached with lids, and the lids are closed when the reagent containers are not used, and thus vaporization or deterioration of reagents are prevented (refer to FIG. 1).

CITATION LIST

Patent Literature

PTL 1: WO11/074472

SUMMARY OF INVENTION

Technical Problem

However, a lid opening/closing mechanism of a reagent container disclosed in PTL 1 selectively opens or closes lids of a plurality of reagent containers, but requires complex control corresponding to open/closed states of the lids of the plurality of reagent containers. Thus, for example, in a case where the automated analysis device is abnormally stopped, and information regarding open/closed states of the lids of the reagent containers is lost, it is difficult to return the reagent containers to a state (initial state) in which all the lids are closed.

Therefore, an object of the present invention is to provide an automated analysis device equipped with a lid opening/closing mechanism with which it is possible to selectively open or close lids of a plurality of reagent containers, as well as to close all of the lids of the plurality of reagent containers, regardless of their current open/closed state.

Solution to Problem

In order to solve the problem, according to the present invention, there is provided an automated analysis device including a container transport device on which a plurality of reagent containers for accommodation of reagents used for analysis of a sample can be mounted; and a lid opening/closing mechanism that can simultaneously open or close a plurality of specific reagent containers located at a dispensing/stirring position among the plurality of reagent containers, in which the lid opening/closing mechanism includes a unit base that is fixed to the container transport device, a hook base part that is rotatably linked to the unit base, a lid opening/closing drive device that moves the hook base part in parallel in an opening/closing direction of lids of the plurality of specific reagent containers with respect to the unit base, a plurality of hooks that are rotatably linked to the hook base part, and respectively engage with the lids of the plurality of specific reagent containers, and a plurality of hook drive devices which can individually rotationally move the plurality of hooks with respect to the hook base part, and in which each of the plurality of hooks includes a claw portion that, when oriented to engage with a lid, causes force to act on the lid in the opening direction, a basal part that, when oriented to engage with the lid, causes force to act on the lid in the closing direction, and a closing protrusion that, when oriented not to engage with the lid, causes force to act on the lid in the closing direction.

Advantageous Effects of Invention

According to the present invention, since lids of a plurality of reagent containers are selective opened or closed, open time of a reagent container which is not in use can be reduced so that vaporization or deterioration of a reagent is prevented, and all of the lids of the plurality of reagent containers can be closed regardless of their current open/closed state in a case where an automated analysis device is abnormally stopped.

BRIEF DESCRIPTION OF DRAWINGS

FIG. 1 is a plan view illustrating the entire configuration of an automated analysis device.

FIG. 2 is a perspective view of a reagent refrigerator from which an upper cover is removed.

FIG. 3 is a sectional view in which the reagent refrigerator from which the upper cover is removed is cut at a dispensing/stirring position.

FIG. 4 is a perspective view of a reagent container lid opening/closing device.

FIG. 5 is a front view of the reagent container lid opening/closing device in which a hook base part is maintained at a reference position.

FIG. 6 is a front view of the reagent container lid opening/closing device illustrating an operation of opening all lids by using hooks.

FIG. 7 is a front view of the reagent container lid opening/closing device illustrating an operation of opening all lids by using the hooks.

FIG. 8 is a front view of the reagent container lid opening/closing device illustrating an operation of opening all of the lids by using the hooks.

FIG. 9 is a front view of the reagent container lid opening/closing device illustrating an operation of closing all of the lids by using the hooks.

FIG. 10 is a front view of the reagent container lid opening/closing device illustrating an operation of closing remaining lids in a state of opening some lids by using the hooks.

FIG. 11 is a front view of the reagent container lid opening/closing device illustrating an operation of closing remaining lids in a state of opening some lids by using the hooks.

FIG. 12 is a front view of the reagent container lid opening/closing device illustrating an operation of closing remaining lids in a state of opening some lids by using the hooks.

FIG. 13 is a front view of the reagent container lid opening/closing device illustrating an operation of closing some lids by using the hooks.

FIG. 14 is a schematic diagram illustrating an operation when a defect occurs in the reagent container lid opening/closing device.

FIG. 15A is a perspective view of the hook.

FIG. 15B is a front view of the hook.

FIG. 15C is a front view of the hook.

FIG. 16 is a front view of the reagent container lid opening/closing device illustrating an operation of closing the lid by using a closing protrusion.

FIG. 17 is a front view of the reagent container lid opening/closing device illustrating an operation of closing the lid by using a closing protrusion.

FIG. 18 is a front view of the reagent container lid opening/closing device illustrating an operation of closing the lid by using a closing protrusion.

FIG. 19 is a front view of the reagent container lid opening/closing device illustrating an operation of closing the lid by using the closing protrusion.

FIG. 20 is a front view of the reagent container lid opening/closing device illustrating an operation of closing the lid by using the closing protrusion.

DESCRIPTION OF EMBODIMENTS

Hereinafter, embodiments of the present invention will be described with reference to the drawings. The same member is given the same reference numeral throughout the drawings, and a repeated description will be omitted as appropriate.

With reference to FIG. 1, a description will be made of a configuration of an automated analysis device according to an embodiment of the present invention. FIG. 1 is a plan view illustrating the entire configuration of the automated analysis device. An automated analysis device 10 illustrated in FIG. 1 automatically performs chemical analysis such as biochemical analysis or immunological analysis in clinical examination. Here, a description will be made of an automated analysis device using a magnetic particle reagent for sample analysis as an example, but the kind of reagent or the like is not particularly limited.

In FIG. 1, the automated analysis device 10 is mainly formed of a magnetic separation stirring device 11, a reagent refrigerator 115, a reagent container lid opening/closing device 121, an incubator 12, a reagent dispensing mechanism 13, a reaction detection unit 14, a shipper 15 which transfers a reaction liquid from the incubator 12 to the reaction detection unit 14, a specimen dispensing nozzle 16, a disposable reaction container 17, a specimen dispensing tip 18, a gripper 19 which transfers the reaction container 17 from the incubator 12 to the magnetic separation stirring device 11, a transport mechanism 20 for the reaction container 17 and the specimen dispensing tip 18, and a reagent stirring mechanism 21.

Next, a description will be made of a fundamental operation of the automated analysis device 10. First, the reaction container 17 disposed in a container holder 22 is disposed on the incubator 12 by the transport mechanism 20. A specimen is put in a specimen container 23 such as a test tube, and is placed on a specimen transport rack 24 so as to be moved to a specimen suction location.

The specimen dispensing tip 18 disposed in a specimen dispensing tip holder 25 is moved to a tip attachment location by the transport mechanism 20. Here, the specimen dispensing tip 18 is attached to a tip end of the specimen dispensing nozzle 16, a specimen is sucked by the specimen dispensing nozzle 16 attached with the specimen dispensing tip 18, and is ejected onto the reaction container 17 on the incubator 12 at a specimen dispensing location 27. After the specimen is dispensed, the specimen dispensing tip 18 is discarded into a discarding box (not illustrated).

A plurality of reagent containers 116 to 118 are disposed in the reagent refrigerator 115. An upper open part of the reagent refrigerator 115 and the reagent container lid opening/closing device 121 are covered with an upper cover 115a (partially illustrated), and thus it is possible to improve cold insulation efficiency through thermal insulation and to prevent permeation of dust or contaminant. The reagent dispensing mechanism 13 can be moved in parallel in a horizontal direction, immerses a tip end of a reagent suction probe 108 (refer to FIG. 4) into a reagent in predetermined reagent containers 116 to 118 through an opening formed in the upper cover 115a, and sucks a predetermined amount of reagent. Next, the reagent dispensing mechanism 13 is moved up so as to be moved in parallel to a predetermined position over the incubator 12, and ejects the reagent into the reaction container 17. The reagent stirring mechanism 21 can also be moved in parallel in the horizontal direction, immerses a tip end of a reagent stirring rod 109 (refer to FIG. 4) into a reagent in predetermined reagent containers 116 to 118 through an opening formed in the upper cover 115a, and stirs the reagent.

After a reaction occurs on the incubator 12 for a predetermined period of time, the reaction container 17 is moved to the magnetic separation stirring device 11 by the gripper 19. After a reaction liquid is subject to magnetic separation in the magnetic separation stirring device 11, or cleaning is performed by a nozzle part 28, the reaction container 17 is transferred again to the incubator 12 from the magnetic separation stirring device 11 by the gripper 19. After a reaction occurs on the incubator 12 for a predetermined period of time, a reaction liquid is transferred to the reaction detection unit 14 by the shipper 15, and a signal is detected from the reaction liquid. The shipper 15 sucks not only a reaction liquid but also a buffer solution and a detection channel cleaning solution in accordance with predefined operation instructions.

FIG. 2 is a perspective view of the reagent refrigerator 115 from which the upper cover 115a is removed, and FIG. 3 is a sectional view in which the reagent refrigerator 115 from which the upper cover 115a is removed is cut at a dispensing/stirring position 113.

The reagent refrigerator 115 includes a reagent disk (container transport device) 120 which can mount a plurality of sets each set including three reagent containers 116 to 118 in which reagents used for analysis of samples are accommodated, and a reagent container lid opening/closing device 121 which opens and closes lids 101 of the reagent containers 116 to 118 located at the dispensing/stirring position 113 over the reagent disk 120.

The reagent containers 116 to 118 are disposed radially on the reagent disk 120. The reagent disk 120 is provided with an outer circumferential disk 110 and an inner circumferential disk 111, and only the outer circumferential disk 110 is rotated horizontally around a vertical axis. The inner circumferential disk 111 is fixed, and has the dispensing/stirring position 113 at which a reagent is dispensed and stirred. The reagent containers 116 to 118 can be moved between the inner circumferential disk 111 and the outer circumferential disk 110 by reagent container inner/outer circumference movement means (not illustrated) in order to perform an analysis process. A frame 114 is provided to cross over the outer circumferential disk 110 and the inner circumferential disk 111 in the reagent disk 120, and the reagent container lid opening/closing device 121 is fixed to the frame 114 and is disposed over the dispensing/stirring position 113.

In a case where an analysis process is performed in the automated analysis device 10 (refer to FIG. 1), for example, if a magnetic particle reagent is accommodated in the reagent container 116, and different reagents A and B are respectively accommodated in the reagent containers 117 and 118, and the three kinds of reagents are treated as a set, first, at least one of the reagents A and B is mixed with a specimen (sample) so as to be heated for a predetermined period of time so that a reaction is caused to progress. Thereafter, either one of the reagents A and B is mixed with the magnetic particle reagent so as to be further heated for a predetermined period of time so that a reaction is caused to progress. In the automated analysis device 10, a reaction liquid generated in the above-described way is analyzed by analysis means (not illustrated) in the subsequent stage. However, dilution of a specimen, a cleaning process before analysis, or the like may be performed in a case where a mixing order of each reagent or heating time is changed depending on an analysis item, or as necessary.

The reagent suction probe 108 (refer to FIG. 4) and the reagent stirring rod 109 (refer to FIG. 4) respectively dispensing and stirring a reagent can simultaneously access the target reagent containers 116 to 118 set in each container 100 on the outer circumferential disk 110 and the inner circumferential disk 111. The outer circumferential disk 110 side of the dispensing/stirring position 113 is a position at which the reagent suction probe 108 accesses a target container among the reagent containers 116 to 118 located at this position so that a reagent is disposed, and the inner circumferential disk 111 side of the dispensing/stirring position 113 is a position at which the magnetic particle reagent in the reagent container 116 located at this position is stirred with the reagent stirring rod 109. A reagent to be used is fundamentally stirred in the following cycle at the dispensing/stirring position 113. In other words, when the current analysis cycle transitions to the next analysis cycle, the container 100 in which a magnetic reagent stirring process is completed is moved from the upper side of the inner circumferential disk 111 to the upper side of the outer circumferential disk 110 by reagent container inner/outer circumference movement means (not illustrated), and a stirred magnetic particle reagent is dispensed thereinto in the next analysis cycle. However, reagents may be dispensed from the reagent containers 116 to 118 on the inner circumferential disk 111, for example, in a case of an emergency process or depending on an analysis item.

FIG. 4 is a perspective view of the reagent container lid opening/closing device 121. The reagent container lid opening/closing device 121 includes a unit base 107 fixed to the frame 114, a hook base part 104 linked to the unit base 107, a lid opening/closing drive device (hook base part drive device) 106 which moves the hook base part 104 in parallel in an opening/closing direction of the lids 101 of the reagent containers 116 to 118 with respect to the unit base 107, and a plurality of hooks 102 provided in the hook base part 104. Although not particularly illustrated, the hook base part 104 is provided with a plurality of hook drive devices which individually rotationally move the respective hooks 102 with respect to the hook base part 104 so as to engage and disengage corresponding hooks with and from the lids 101 of the reagent containers 116 to 118.

Here, a set of the reagent containers 116 to 118 are set in a single container 100, and three kinds of reagents are held in a single container 100 if different reagents are respectively put in the reagent containers. In the present embodiment, two sets of the reagent containers 116 to 118 are arranged at the dispensing/stirring position 113 in a diameter direction of the reagent disk 120.

In the present embodiment, two sets each including the three reagent containers 116 to 118 are disposed side by side at the dispensing/stirring position 113, but the number of sets may be increased depending on a size of the reagent disk 120, that is, there may be a configuration in which only one set of the reagent containers 116 to 118 is disposed at the dispensing/stirring position 113, or there may be a configuration in which three or more sets thereof can be disposed at the dispensing/stirring position. A description has been made of an example of a case where three reagent containers 116 to 118 are mounted in a single container 100, but two reagent containers or four or more reagent containers may be set in the container 100 depending on the reagent disk 120 or the container 100. The present invention is not limited to a configuration in which a plurality of reagent containers form a set in a single container 100, and there may be a configuration in which a single reagent container not forming a set with other reagent containers is separately set at the dispensing/stirring position 113.

The unit base 107 is fixed to the front frame 114 with bolts or the like, and has a fixed positional relationship with respect to the reagent disk 120. In the present embodiment, the lid opening/closing drive device 106 is fixed to the unit base 107 via a bracket or the like as appropriate. A motor, a cylinder, or the like may be used in the lid opening/closing drive device 106, and, in the present embodiment, a pulse motor is used.

The hook base part 104 is linked to the lid opening/closing drive device 106 via a parallel link formed of two arms 105, and is moved in parallel in an opening/closing direction of the lids 101 of the reagent containers 116 to 118 if the arms 105 are rotationally moved due to an operation of the lid opening/closing drive device 106 (in FIG. 8, the opening direction of the lid 101 is indicated by a dotted arrow, and the movement direction of the hook base part 104 is indicated by a solid arrow). In a case of the present embodiment, an opening/closing operation of the lid 101 corresponds to arc movement, and thus the hook base part 104 also draws an arc trajectory so as to be moved in parallel.

The hooks 102 are claw components for hooking the lids 101 of the reagent containers 116 to 118, and six hooks are provided under the hook base part 104 along the diameter direction of the reagent disk 120 in accordance with the number of reagent containers 116 to 118 which can be arranged at the dispensing/stirring position 113. Of course, the number of hooks 102 may be changed by design depending on the number of reagent containers 116 to 118 which can be arranged at the dispensing/stirring position 113. Each of the hooks 102 is linked to an output shaft of a corresponding hook drive device (not illustrated) in the hook base part 104 via a hook shaft 103, and is rotationally moved and displaced centering on the hook shaft 103 due to an operation of the hook drive device. A motor, a cylinder, or the like may be used in the hook drive device, and, in the present embodiment, a pulse motor is used.

Next, a description will be made of an operation of the reagent container lid opening/closing device 121 with the above-described configuration. In summary, the reagent container lid opening/closing device 121 of the present embodiment selectively engages the corresponding hook 102 with the lid 101 of a container desired to be opened or closed among the six reagent containers 116 to 118 located at the dispensing/stirring position 113, and displaces the hook base part 104 in an opening direction or a closing direction in this state so as to open or close only the lid 101 engaged with the hook 102. For example, in a case of opening the lid 101 of a specific reagent container (here, the reagent container 117 on the inner circumferential disk 111), the corresponding hook 102 is lowered to an engagement position in a state in which the hook base part 104 is located at a lower position (a position where the hook base part has fallen in the closing direction), the hook base part 104 is displaced to an upper position (a position where the hook base part has risen in the opening direction) by driving the lid opening/closing drive device 106, and thus only the lid 101 of the reagent container 117 hooked by the hook 102 is pulled up. Conversely, in a case where the lid 101 of the reagent container 117 is closed, the lid opening/closing drive device 106 is driven in a state in which the corresponding hook 102 is lowered to the engagement position so that the hook base part 104 is displaced from the upper position in the closing direction, and thus the lid 101 of the reagent container 117 is pressed down with the hook 102. In other words, when the lid 101 of the reagent container 117 is opened, and then is closed in the next operation, the hook base part 104 may be displaced in the closing direction from the posture after the opening operation so as to be moved to the lower position.

With reference to FIGS. 5 to 9, a description will be made of a specific sequence of opening and closing of the lids performed by the reagent container lid opening/closing device 121. FIGS. 5 to 9 are front views of the reagent container lid opening/closing device, in which an operation of the hook base part 104 is indicated by a thick solid line, an operation of the hook 102 is indicated by a thin solid arrow, and operations of the lids 101 of the reagent containers 116 to 118 are indicated by dotted arrows. In FIGS. 5 to 9, for convenience of description, the letters a to f are added to the hooks 102 and the lids 101 in order from the left.

First, FIG. 5 illustrates a state in which the hook base part 104 is located at a reference position, the lids 101a to 101f of the reagent containers 116 to 118 are all closed, the hook base part 104 is stopped at the upper position, and the hooks 102a to 102f are oriented vertically downward.

FIG. 6 illustrates a state right before the hooks 102a to 102f are hooked to the lids 101a to 101f of the reagent containers 116 to 118, the hook base part 104 is moved from the upper position to the lower position in the state illustrated in FIG. 5 due to operations of the arms 105, and the hooks 102a to 102f are rotationally moved and displaced in a clockwise direction (hereinafter, referred to as a "separation direction") in the figure by a predetermined angle so as not to contact with the corresponding lids 101a to 101f.

FIG. 7 illustrates a state in which the hooks 102a to 102f are hooked to the lids 101a to 101f of the reagent containers 116 to 118, and the hooks 102a to 102f are displaced to an engagement position in the state illustrated in FIG. 6 so as to be hooked to the corresponding lids 101a to 101f of the reagent containers 116 to 118.

FIG. 8 illustrates an operation of opening all of the lids 101a to 101f of the reagent containers 116 to 118, and the hook base part 104 is displaced in the opening direction so as to be moved to the upper position by driving the lid opening/closing drive device 106 in the state illustrated in FIG. 7.

FIG. 9 illustrates an operation of closing all of the lids 101a to 101f of the reagent containers 116 to 118, and the hook base part 104 is displaced in the closing direction so as to be moved to the lower position by driving the lid opening/closing drive device 106 in the state illustrated in FIG. 8. At this time, the hook base part 104 is moved to a slightly lower side than the position illustrated in FIG. 7 so as to press the lids 101a to 101f downward at basal parts of the hooks 102a to 102f, and thus the lids 101a to 101f of the reagent containers 116 to 118 are surely closed.

In a case where the hook base part 104 is returned to the reference position (refer to FIG. 5) in the state illustrated in FIG. 9, first, the hooks 102a to 102f is displaced in the separation direction (refer to FIG. 6), the hook base part 104 is displaced in the opening direction so as to be moved to the upper position, and the hooks 102a to 102f is displaced in the engagement direction so as to be returned to be oriented vertically downward.

FIGS. 5 to 9 illustrate the sequence of simultaneously opening or closing the lids 101a to 101f of the six reagent containers 116 to 118, but, according to the present embodiment, postures of the hooks 102a to 102f during displacement of the hook base part 104 are individually changed, and thus the lids 101a to 101f of the reagent containers 116 to 118 can be selectively opened or closed. For example, in a case where only the reagent container 117 on the container 100 on the inner circumferential disk 111 side (the left parts in FIGS. 5 to 9) is opened or closed, when transition occurs from FIG. 6 to FIG. 7 in the above-described sequence, if the hook 102b corresponding to the reagent container 117 is displaced in the vertical direction as illustrated in FIG. 7 in a state in which the hooks 102a and 102c to 102f are maintained in the postures illustrated in FIG. 6, only the lid 101b is opened when transition to the operation illustrated in FIG. 8 occurs. In a case where the lid 101b is closed, if the operation illustrated in FIG. 9 is performed in a state in which postures of the hooks 102a to 102f are maintained, the lid 101b can be closed with the hook 102b located at the engagement position without the hooks 102a and 102c to 102f interfering with the corresponding lids 101a and 101c to 101f.

In the present embodiment, when the lids 101a to 101f of the reagent containers 116 to 118 are opened, the reagent suction probe 108 or the reagent stirring rod 109 accesses the opened reagent containers. For example, in a case where a solution containing magnetic particles which are easily immersed is put in the reagent container 116 among a set of the reagent containers 116 to 118, it is necessary to stir the solution in the reagent container 116 with the reagent stirring rod 109 in order to dispense a uniform solution. This stirring requires a long period of time, and thus the reagent stirring rod 109 is required to access a reagent container for a longer period of time than the reagent suction probe 108. In other words, since there is a difference between the times required to access the reagent container 116 and the reagent containers 117 and 118 due to a difference between solutions, for example, even if the reagent stirring rod 109 accesses the reagent container 116 and the reagent suction probe 108 accesses the reagent container 117 at the same time, suction is completed during stirring. Therefore, it is desirable that the lid 101b of the reagent container 117 in which suction of a reagent is completed is closed as soon as possible even during stirring of a reagent in the reagent container 116, and thus vaporization or deterioration of the reagent is prevented.

The reagent container lid opening/closing device 121 of the present embodiment can also cope with this case. For example, in a case where a lid (for example, the lid 101a) of a specific reagent container is maintained to be in an open state, and lids (lids 101b to 101f) of remaining reagent containers are closed in a state in which the lids (the lids 101a to 101f) of all of the reagent containers are in an open state (refer to FIG. 8), as illustrated in FIG. 10, if the hook base part 104 is moved in the closing direction by driving the lid opening/closing drive device 106 in a state in which the hooks 102b to 102f are maintained at the engagement positions, the hook 102a is displaced in the separation direction so that the hook 102a does not interfere with the opened lid 101a. Consequently, the lids 101b to 101f of the other reagent containers can be closed in a state in which the lid 101a of the leftmost reagent container 116 is opened.

Thereafter, if the lid 101a is to be closed, as illustrated in FIG. 11, first, the hook base part 104 is slightly moved up so that the hooks 102b to 102f closing the lids 101b to 101f are rotationally moved and displaced in the separation direction by a predetermined angle and are thus separated from the lids 101b to 101f. Next, as illustrated in FIG. 12, the hooks 102a to 102f are lowered to the engagement positions in synchronization with the operation of displacing the hook base part 104 to the upper position, and thus only the hook 102a is engaged with the lid 101a at the reference position. Next, as illustrated in FIG. 13, the hooks 102b to 102f are rotationally moved and displaced in the separation direction by a predetermined angle in synchronization with the operation of displacing the hook base part 104 to the lower position, and the lid 101a is pressed and closed at the basal part of the hook 102a. Finally, the hook base part 104 is returned to the reference position (refer to FIG. 5) via the state illustrated in FIG. 6.

Next, a description will be made of an operation of the reagent container lid opening/closing device 121 during an analysis process in the automated analysis device 10.

Although not particularly illustrated, the automated analysis device 10 of the present embodiment is provided with a control device which controls the lid opening/closing drive device 106 of the reagent container lid opening/closing device 121 and the hook drive device on the basis of sample analysis request information, and opens the lid 101 of a corresponding reagent container when dispensing and stirring of a reagent are started and also closes the lid 101 of the corresponding reagent container when dispensing and stirring of the reagent are finished.

According to the present embodiment, as described above, a plurality of hooks 102a to 102f are provided in the hook base part 104, the hooks 102a to 102f are individually engaged with and disengaged from the lids 101a to 101f of the reagent containers 116 to 118, the hook base part 104 is displaced in the opening/closing direction of the lids 101a to 101f with the single lid opening/closing drive device 106, and thus the lids 101a to 101f of the reagent containers 116 to 118 can be selectively opened or closed.

Consequently, lids of other reagent containers which are not required to be opened are not opened in order to open a lid of a target reagent container. For example, in a case where one process is finished earlier as when a stirring process and a dispensing process are performed together, lids can be closed in the order of the process being finished without waiting for the other process to be finished. As mentioned above, according to the present embodiment, it is possible to prevent vaporization or deterioration of a reagent by reducing open time of a reagent container which is not in use.

Next, a description will be made of an initial state returning operation performed by the reagent container lid opening/closing device 121. The "initial state returning operation" mentioned here indicates an operation of returning all of the lids of the six reagent containers 116 to 118 located at the dispensing/stirring position 113 to a closed state (initial state) regardless of the current open/closed state.

During an analysis process in the automated analysis device 10, as described above, the lids 101a to 101f are selectively opened or closed by claw portions 203 of the plurality of hooks 102a to 102f, and thus open/closed states of the lids 101a to 101f may be different from each other for the respective reagent containers. An opening or closing operation for the lids using the claw portions 203 is divided into four ways such as 1) an operation of maintaining a closed state, 2) an opening operation, 3) a closing operation, and 4) an operation of maintaining an open state, and each way is accompanied by the unique operation. In other words, unless the hooks 102a to 102f are rotationally moved in accordance with open/closed states of the lids 101a to 101f, there is a possibility that the hooks 102a to 102f may interfere with the reagent containers 116 to 118 during an operation of the hook base part 104, and thus errors may occur in a lid opening/closing operation. FIG. 14 is a schematic diagram illustrating an operation when an error occurs in the reagent container lid opening/closing device 121. In the figure, the hook base part 104 and the hooks 102a and 102b at the reference position are indicated by dashed lines. As illustrated in FIG. 14, if the automated analysis device 10 is abnormally stopped in a state in which the lids 101a and 101b of the sample containers 116 and 117 are closed, and the lid 101c of the sample container 118 is opened, the control device looses information regarding open/closed states of the lids. In a case where the control device wrongly recognizes that the lid 101a is opened, and the lids 101b and 101c are closed, thus maintains the hook 102a at the engagement position in order to close only the lid 101a, and rotationally moves the hook base part 104 downward in a state in which the hooks 102b and 102c are maintained at the separation positions, the hook 102a interferes with the actually closed lid 101a located at the engagement position, and the hook 102c located at the separation position interferes with the actually opened lid 101c. As mentioned above, if positions of the hooks 102a to 102f do not match open/closed states of the lids 101a to 101f, an error may occur in an opening/closing operation.

Since the control device holds information regarding an open/closed state of the lid during an analysis process, the above-described error does not occur, but, for example, if the automated analysis device 10 is abnormally stopped due to instantaneous interruption such as a power failure, the information regarding an open/closed state of the lid held in the control device is lost, and thus an open/closed state of the lid thereafter cannot be controlled. Therefore, in a case where the automated analysis device 10 is abnormally stopped, it is necessary to return all of the lids to a closed state (initial state) before an analysis process is resumed.

The hooks 102 in the present embodiment have shapes in which all of the lids can be closed regardless of the current open/closed states of the lids 101a to 101f. FIG. 15A is a perspective view of the hook 102 in the present embodiment. As illustrated in FIG. 15A, the hook 102 has a linkage portion 205 linked to the hook shaft 103 (refer to FIG. 4); an arm portion 204 extending vertically downward from a front end of the linkage portion 205; a basal part 202 extending in a horizontal direction on an opposite side to the linkage portion 205 from a front end of the arm portion 204; two claw portions 203 extending vertically downward from both ends of the basal part 202; and a closing protrusion 201 which is perpendicular to the basal part 202 and extends in the horizontal direction from the front end of the arm portion 204. For simplification of description, FIGS. 2 to 13 do not illustrate the closing protrusion 201, but there is no difference due to the presence or absence of the closing protrusion 201 in a normal operation.

FIG. 15B is a front view of the hook 102 when oriented to engage with a lid. FIG. 15C is a front view of the hook 102 when not oriented to engage with a lid, and the hook 102 when oriented to engage with a lid is indicated by a dashed line. As illustrated in FIGS. 15B and 15C, a front end (action point) of the closing protrusion 201 and an action point of the basal part 202 used during normal closing are located on the same radius from the rotation center of the hook 102. Consequently, as illustrated in FIG. 15C, if the hook 102 is only rotationally moved, the claw portions 203 can be retracted to a position not causing interference with the lid 101, and the action point of the closing protrusion 201 can also be caused to match the action point of the basal part 202 when oriented to engage with the lid. Both of the action points are not necessarily required to be disposed on the same radius, and the action point of the closing protrusion 201 may be moved to the same position as that of the action point of the basal part 202 through a combination between rotational movement of the hook 102 and rotational movement of the hook base part 104.

With reference to FIGS. 16 to 20, a description will be made of an initial state returning operation performed by the reagent container lid opening/closing device 121 configured in the above-described way. Herein, a case is assumed in which three reagent containers 116 to 118 on the inner circumferential disk 111 side are opened, and three reagent containers 116 to 118 on the outer circumferential disk 110 side are closed. If the control device of the automated analysis device 10 detects that the automated analysis device is abnormally stopped when the previous operation is finished, the control device controls an operation of the reagent container lid opening/closing device 121 as follows so that the reagent container lid opening/closing device 121 performs an initial state returning operation.

First, the hook base part 104 is returned to the reference position (FIG. 16). Next, the hook base part 104 is rotationally moved up to a position where the hooks 102a to 102c do not interfere with the lids 101a to 101c (FIG. 17). Next, all of the hooks 102 are rotationally moved so that a position for engagement with the lid 101 is switched from the basal part 202 to the closing protrusion 201 (FIG. 18). Next, the hook base part 104 is moved down to the closing position (FIG. 19). Finally, the hook base part 104 is returned to the reference position, and the hooks 102a to 102f are also returned to the engagement positions so as to be returned to the reference position (FIG. 20). As mentioned above, since the currently opened lid 102 is closed by the closing protrusion 202 without the claw portions 203 interfering with the currently closed lid 101, all of the lids 101 can be closed regardless of the current open/closed states of the lids 101.

If the closing protrusion 201 is formed at a position where the closing protrusion can be brought into contact with the lid 101 when the lid 101 is oriented not to interfere with the claw portions 203, the above-described initial state returning operation can be performed, but, as illustrated in FIG. 18 or 19, an action point of the closing protrusion 201 is formed to be the lowest point in the whole of the hook 102 in a posture in which the closing protrusion 201 causes force to act on the lid 101 in the closing direction. Therefore, even in a case where the automated analysis device 10 is abnormally stopped during movement of the reagent containers 116 to 118 between the inner circumferential disk 111 and the outer circumferential disk 110, and an initial state returning operation is performed on the reagent containers 116 to 118 during movement, the claw portions 203 of the hook 102 can be prevented from interfering with the closed lid 101.

The present invention is not limited to the above-described embodiment, and includes various modification examples within the scope without departing from the spirit thereof. For example, the present invention is not limited to including all of the configurations described in the embodiment, and includes embodiments in which some of the configurations are omitted.

REFERENCE SIGNS LIST

10 AUTOMATED ANALYSIS DEVICE, 11 MAGNETIC SEPARATION STIRRING DEVICE, 12 INCUBATOR, 13 REAGENT DISPENSING MECHANISM, 14 REACTION DETECTION UNIT, 15 SHIPPER, 16 SPECIMEN DISPENSING NOZZLE, 17 REACTION CONTAINER, 18 SPECIMEN DISPENSING TIP, 19 GRIPPER, 20 TRANSPORT MECHANISM, REAGENT STIRRING MECHANISM, 22 CONTAINER HOLDER, 23 SPECIMEN CONTAINER, 24 SPECIMEN TRANSPORT RACK, 25 SPECIMEN DISPENSING TIP HOLDER, 26 TIP ATTACHMENT LOCATION, 27 SPECIMEN DISPENSING LOCATION, 28 NOZZLE PART, 100 CONTAINER, 101 AND 101a TO 101f LID, 102 AND 102a TO 101f HOOK, 103 HOOK SHAFT, 104 HOOK BASE PART, 105 ARM, 106 LID OPENING/CLOSING DRIVE DEVICE, 107 UNIT BASE, 108 REAGENT SUCTION PROBE, 109 REAGENT STIRRING ROD, 110 OUTER CIRCUMFERENTIAL DISK, 111 INNER CIRCUMFERENTIAL DISK, 112 STOCK POSITION, 113 DISPENSING/STIRRING POSITION, 114 FRAME, 115 REAGENT REFRIGERATOR, 115a UPPER COVER, 116 TO 118 REAGENT CONTAINER, 120 REAGENT DISK (CONTAINER TRANSPORT MECHANISM), 121 REAGENT CONTAINER LID OPENING/CLOSING DEVICE (LID OPENING/CLOSING DEVICE), 201 CLOSING PROTRUSION, 202 BASAL PART, 203 CLAW PORTION, 204 ARM PORTION, 205 LINKAGE PORTION

The invention claimed is:
1. An automated analysis device comprising:
a container transport device on which a plurality of reagent containers for accommodation of reagents used for analysis of a sample can be mounted; and
a lid opening/closing mechanism that can simultaneously open or close a plurality of specific reagent containers located at a dispensing/stirring position among the plurality of reagent containers,
wherein the lid opening/closing mechanism includes
a unit base that is fixed to the container transport device,
a hook base part that is rotatably linked to the unit base, a lid opening/closing drive device that moves the hook base part in parallel in an opening/closing direction of lids of the plurality of specific reagent containers with respect to the unit base, a plurality of hooks that are rotatably linked to the hook base part, and respectively engage with the lids of the plurality of specific reagent containers, and a plurality of hook drive devices which can individually rotationally move the plurality of hooks with respect to the hook base part, and wherein each of the plurality of hooks includes a claw portion that, when each claw portion is oriented to engage with a lid, causes a force to act on the lid in the opening direction, a basal part that, when each basal part is oriented to engage with the lid, causes a force to act on the lid in the closing direction, and a closing protrusion that, when each basal part is oriented not to engage with the lid, engages an open lid and causes a force to act on the open lid to move that open lid in the closing direction.

2. The automated analysis device according to claim 1, wherein each of the plurality of hooks is formed so that an action point of the closing protrusion is the lowest point of the closing protrusion when the hook is oriented not to engage with the lid.

3. The automated analysis device according to claim 1, wherein each of the plurality of hooks is formed so that an action point of the basal part and an action point of the closing protrusion are located on the same radius from the rotation center.

4. The automated analysis device according to claim 1, further comprising:

a control device that controls an operation of the lid opening/closing mechanism so that the lid opening/closing mechanism performs an initial state returning operation, if it is detected that the automated analysis device is abnormally stopped when the positive operation is finished.

5. The automated analysis device according to claim 4, wherein the initial state returning operation includes a first operation of rotationally moving the plurality of hooks so that the closing protrusion is oriented to act on the lids of the plurality of specific reagent containers, and a second operation of rotationally moving the hook base part so that the hook base part is moved in parallel in the closing direction of the lids of the plurality of specific reagent containers, following the first operation.

* * * * *